United States Patent
Petrick et al.

(10) Patent No.: US 6,718,010 B2
(45) Date of Patent: Apr. 6, 2004

(54) METHOD AND APPARATUS FOR ACQUIRING A SERIES OF IMAGES UTILIZING A SOLID STATE DETECTOR WITH ALTERNATING SCAN LINES

(75) Inventors: Scott W. Petrick, Sussex, WI (US); Alan Dean Blomeyer, Milwaukee, WI (US); David Conrad Neumann, Milwaukee, WI (US); Habib Vafi, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/064,100

(22) Filed: Jun. 11, 2002

(65) Prior Publication Data

US 2003/0227997 A1 Dec. 11, 2003

(51) Int. Cl.[7] .................................................. H05G 1/64
(52) U.S. Cl. .................................. 378/98.8; 250/370.09
(58) Field of Search ............ 378/19, 96.8; 250/370.08, 250/370.09, 370.1, 370.11

(56) References Cited

U.S. PATENT DOCUMENTS

| 4,996,413 | A | | 2/1991 | McDaniel et al. ........ 250/208.1 |
| 5,530,935 | A | * | 6/1996 | Dillen ........................ 378/98.2 |
| 6,028,913 | A | * | 2/2000 | Meulenbrugge et al. ... 378/98.8 |
| 6,208,710 | B1 | * | 3/2001 | Nagai ......................... 378/108 |
| 6,222,901 | B1 | * | 4/2001 | Meulenbrugge et al. ...... 378/19 |
| 6,259,098 | B1 | | 7/2001 | Vafi et al. ............. 250/370.09 |
| 6,404,852 | B1 | | 6/2002 | Petrick et al. ............ 378/98.8 |

\* cited by examiner

Primary Examiner—Edward J. Glick
Assistant Examiner—Allen C. Ho
(74) Attorney, Agent, or Firm—McAndrews, Held & Malloy, Ltd.; Peter J. Vogel; Michael A. Dellapenna

(57) ABSTRACT

An x-ray detector is provided to acquire an image. The x-ray detector comprises detector elements that store a charge representative of an x-ray level. The detector elements are arranged in rows and columns. Scan lines are arranged in rows or columns and connect to the detector elements. First and second sets of sensing circuits read the charge from the detector elements. A first set of data lines connects to the first set of sensing circuits and a second set of data lines connects to the second set of sensing circuits. At least one of the data lines from the first set of data lines is interspersed with the second set of data lines.

22 Claims, 5 Drawing Sheets

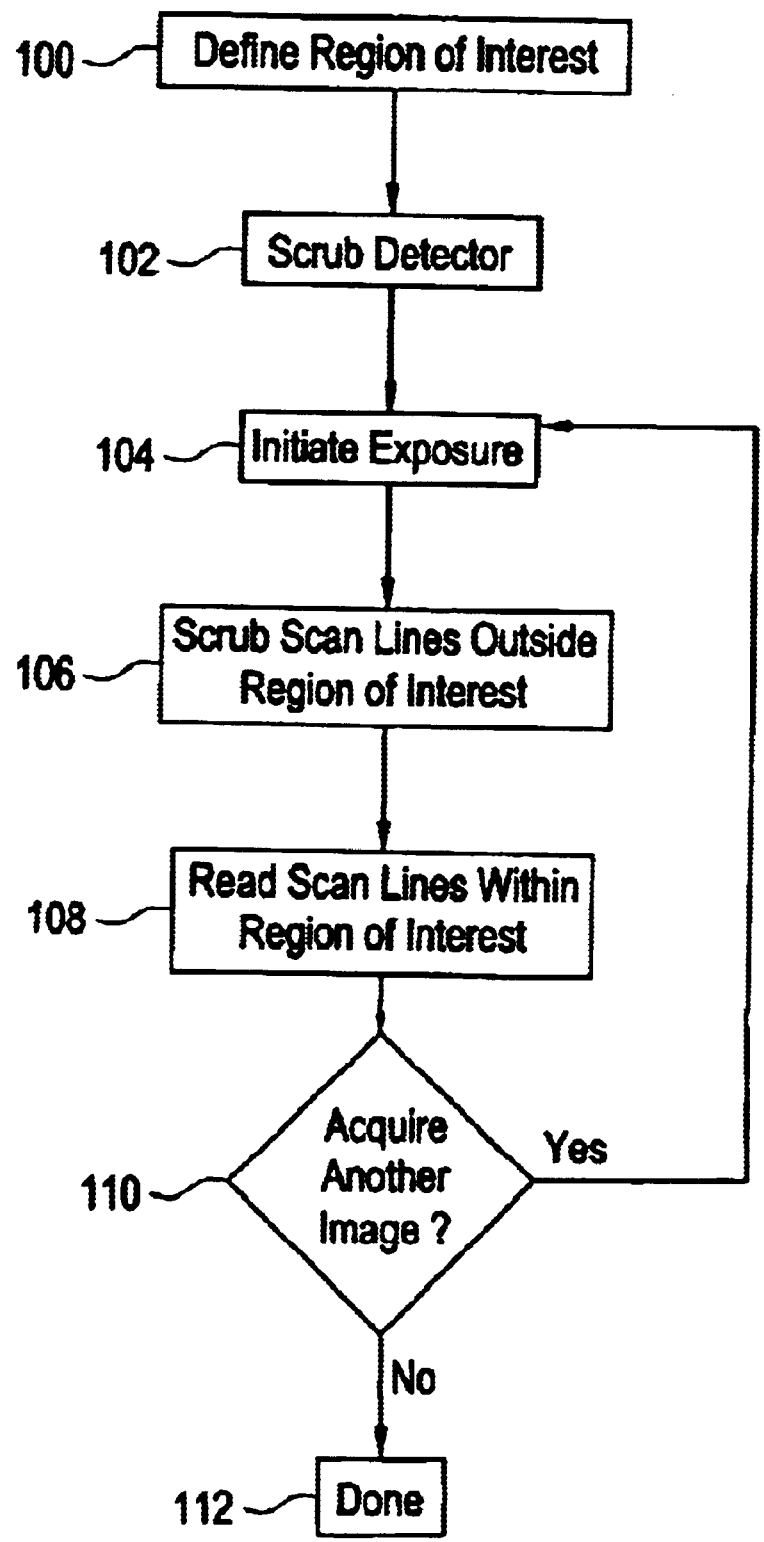

METHOD AND APPARATUS FOR
ACQUIRING A SERIES OF IMAGES
UTILIZING A SOLID STATE DETECTOR
WITH ALTERNATING SCAN LINES

BACKGROUND OF INVENTION

Certain embodiments of the present invention generally relate to x-ray systems utilizing a solid state multiple element x-ray detector for producing an image; and more particularly, to techniques and apparatus for acquiring a series of images representative of a region of interest smaller than the x-ray detector.

Solid state x-ray detectors that comprise a two dimensional array of detector elements arranged in rows and columns are known in the art. A scintillator, such as Cesium Iodide (CsI), is deposited over the detector elements. The CsI absorbs x-rays and converts the x-rays to light, which is then detected by the detector elements.

Each detector element comprises a photodiode, which acts as a capacitor and stores charge representative of an amount of radiation incident on the detector element, and a field effect transistor (FET) that operates as a switch to enable and disable read out of the charge stored on the photodiode. Each detector element is connected to both a row, or scan line, and a column, or data line. The scan and data lines are used to activate the FET and read the level of stored charge in the photodiode.

Electronic noise caused by resistance and capacitance in the data lines may negatively impact the image quality of the detector. The amount of resistance and capacitance in the data lines decreases as the length of the data lines decreases. Therefore, in order to minimize the electronic noise and thus improve the image quality of the detector, the detector was designed with a split in each data line at the midpoint to reduce its length, effectively splitting the reading of the detector into two separate operations.

After an exposure, the detector is read on a row by row basis and digitized for further image processing, storage, and display. With a detector that has split data lines, two rows may be read at the same time. Two sets of read out electronics on two sides of the detector are required, rather than one set if the data lines are not split. Therefore, in order to achieve the same detector read out rate, or acquisition frame rate, the speed of the read out electronics may need to be only half what would be required of the read out electronics with unsplit data lines.

Several applications of the solid state detector are thoracic, vascular, and cardiac imaging. The entire detector field of view (FOV) may be utilized to acquire diagnostic data during thoracic applications. However, vascular and cardiac applications are interested in events that occur over time in regions of the body that may not require the entire detector FOV but do require a high frame rate.

Unfortunately, it is not always possible to have multiple x-ray detectors and systems dedicated to specific applications. When a specific application is targeted, detector design tradeoffs such as the area to be covered, pixel size, dynamic range, and acquisition frame rate are made to optimize the detector's performance in regards to that application. For example, small pixel size, providing superior spatial resolution, comes at the cost of frame rate for a given size detector, or conversely, at the increased cost of wider bandwidth as well as increased cost of more channels (both read out and FET drive electronics). Large dynamic range, given that more conversion levels take more time, will also adversely impact frame rate. For a given pixel size, a larger detector will cost more for the required support electronics, and will not support frame rates as fast as a smaller detector that has the same Therefore, larger detectors with small pixels, while desirable for thoracic applications, may not have the bandwidth to support higher frame rates, such as those desirable for cardiac applications. With a lower frame rate, less temporal information may be acquired over the same time span compared to a smaller detector that can be completely read out more quickly.

Efforts have been made to address the use of larger, fine resolution detectors in applications that require a smaller region of interest (ROI) and for which an increased frame rate is desired. A smaller ROI may be defined centered about the split in the data lines without any throughput penalty. The scan lines outside the ROI may be read or scrubbed to restore the charge during an x-ray exposure. However, the data is of no interest and may be discarded or not collected. Then, after the x-ray exposure, the scan lines inside the ROI are read.

In some instances however, due to patient positioning, it may be desirable to define a small ROI along one edge or in a corner of the detector rather than in the center. But defining a smaller ROI asymmetric about the split in the data lines will require more time to read the detector, adversely affecting the acquisition frame rate. The split data line design thus becomes a limitation with regards to the acquisition frame rate as the highest rate can only be achieved when the ROI incorporates an equal number of scan lines on each side of the split in the data lines. If a larger number of scan lines is desired on one side of the split than the other, the read out electronics will require more cycles of operation for the first side, while the read out electronics for the second side will be idle during a portion of the acquisition. This effectively reduces the throughput for the entire detector by a factor of two during the read out of every scan line on the first side for which there is no complimentary scan line on the second side.

Thus, a need exists in the industry for a detector designed to acquire images that utilize the entire field of view of the detector, in addition to acquiring a series of images utilizing a small region of interest and a high acquisition frame rate, regardless of the placement of the region of interest on the detector, to address the problems noted above and previously experienced.

SUMMARY OF INVENTION

In accordance with at least one embodiment, an x-ray detector is provided to acquire an image. The x-ray detector comprises detector elements that store a charge representative of an x-ray level. The detector elements are arranged in rows and columns. Scan lines are arranged in rows or columns and connect to the detector elements. First and second sets of sensing circuits are utilized to read the charge from the detector elements. A first set of data lines connects to the first set of sensing circuits and a second set of data lines connects to the second set of sensing circuits. At least one of the data lines from the first set of data lines is interspersed with the second set of data lines.

In accordance with at least one embodiment, an x-ray system used to produce an image is provided. The x-ray system includes an x-ray source for generating x-rays and a detector comprising detector elements arranged in rows and columns. The detector elements store charge representative of an x-ray level. The x-ray system also includes first and second sets of sensing circuits reading charge from first and second sets of detector elements, respectively. First and second sets of scan lines are provided comprising groups including at least one consecutive scan line connecting to each detector element in one of the rows and columns. The first and second sets of scan lines connect to the first and second sets of detector elements. The groups in the first set of scan lines are adjacent to and alternate with the groups in the second set of scan lines.

In accordance with at least one embodiment, a method for acquiring x-ray data within a region of interest is provided. A region of interest in an x-ray detector is defined. The region of interest includes detector elements connecting to data and scan lines which are perpendicular to each other and each cross one dimension of the x-ray detector. The scan lines form groups comprising at least one consecutive scan line. The x-ray detector is exposed to a radiation source. After the x-ray detector is exposed, levels of charge stored by detector elements included in first and second groups of scan lines are read simultaneously with first and second sensing circuits, respectively. Levels of charge stored by detector elements included in third and fourth groups of scan lines are then read simultaneously with first and second sensing circuits, respectively. The first and second groups of scan lines are adjacent and are included in the region of interest, and the third group of scan lines are adjacent to the second group of scan lines.

BRIEF DESCRIPTION OF DRAWINGS

FIG. 6 illustrates a method for acquiring data within a region of interest using a detector with alternating scan lines in accordance with an embodiment of the present invention.

The foregoing summary, as well as the following detailed description of certain embodiments of the present invention, will be better understood when read in conjunction with the appended drawings. It should be understood, however, that the present invention is not limited to the arrangements and instrumentality shown in the attached drawings.

DETAILED DESCRIPTION

Figure 1:
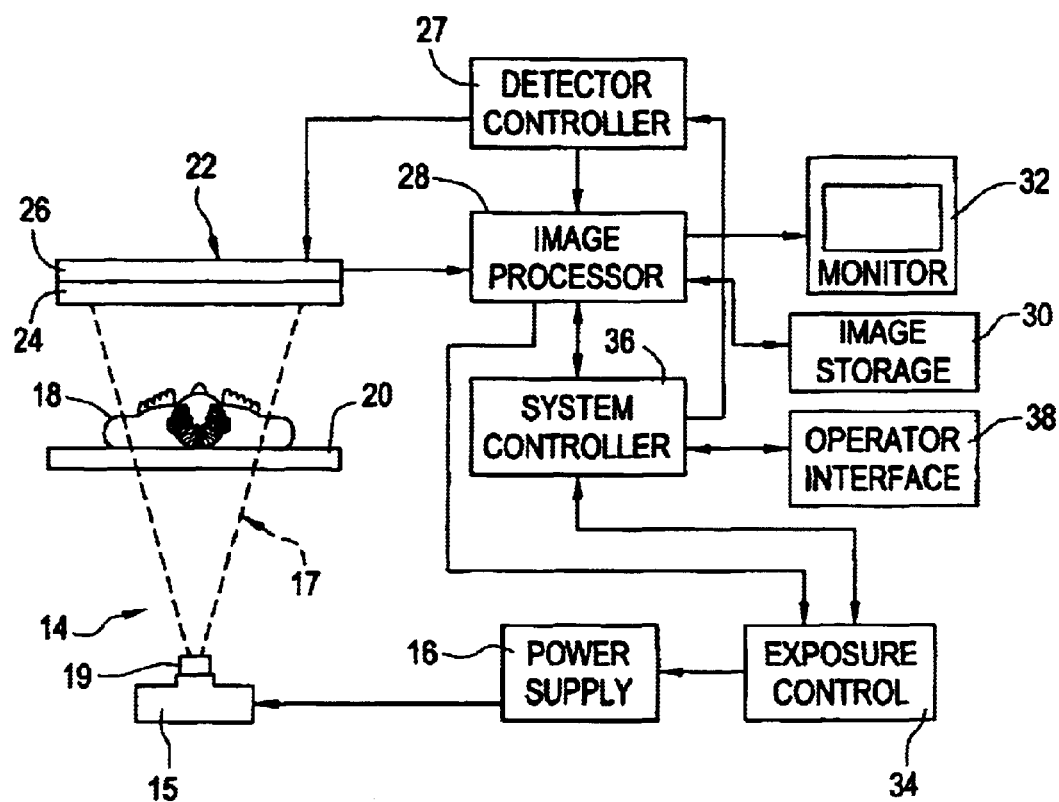
FIG. 1 illustrates a block diagram of an x-ray system in accordance with an embodiment of the present invention.

FIG. 1 illustrates a block diagram of an x-ray system 14. The x-ray system 14 includes an x-ray tube 15 which, when excited by a power supply 16, emits an x-ray beam 17. As illustrated, the x-ray beam 17 is directed toward a patient 18 lying on an x-ray transmissive table 20. A collimator 19 may be utilized to block a portion of the x-ray beam 17. The portion of the x-ray beam 17 which is transmitted through the table 20 and the patient 18 impinges upon an x-ray detector 22. The x-ray detector 22 comprises a scintillator 24 that converts the x-ray photons to lower energy photons in the visible spectrum. Contiguous with the scintillator 24 is a photo detector array 26, which converts the light photons into an electrical signal. A detector controller 27 contains electronics for operating the photo detector array 26 to acquire an image and to read out the signal from each photo detector element.

The output signal from the photo detector array 26 is coupled to an image processor 28 that includes circuitry for processing and enhancing the x-ray image signal. The processed image then is displayed on a video monitor 32 and may be archived in an image storage device 30. The image processor 28 additionally produces a brightness control signal which is applied to an exposure control circuit 34 to regulate the power supply 16 and thereby the x-ray exposure. The overall operation of the x-ray system 14 is governed by a system controller 36 that receives commands from an x-ray technician via an operator interface panel 38.

Figure 2:
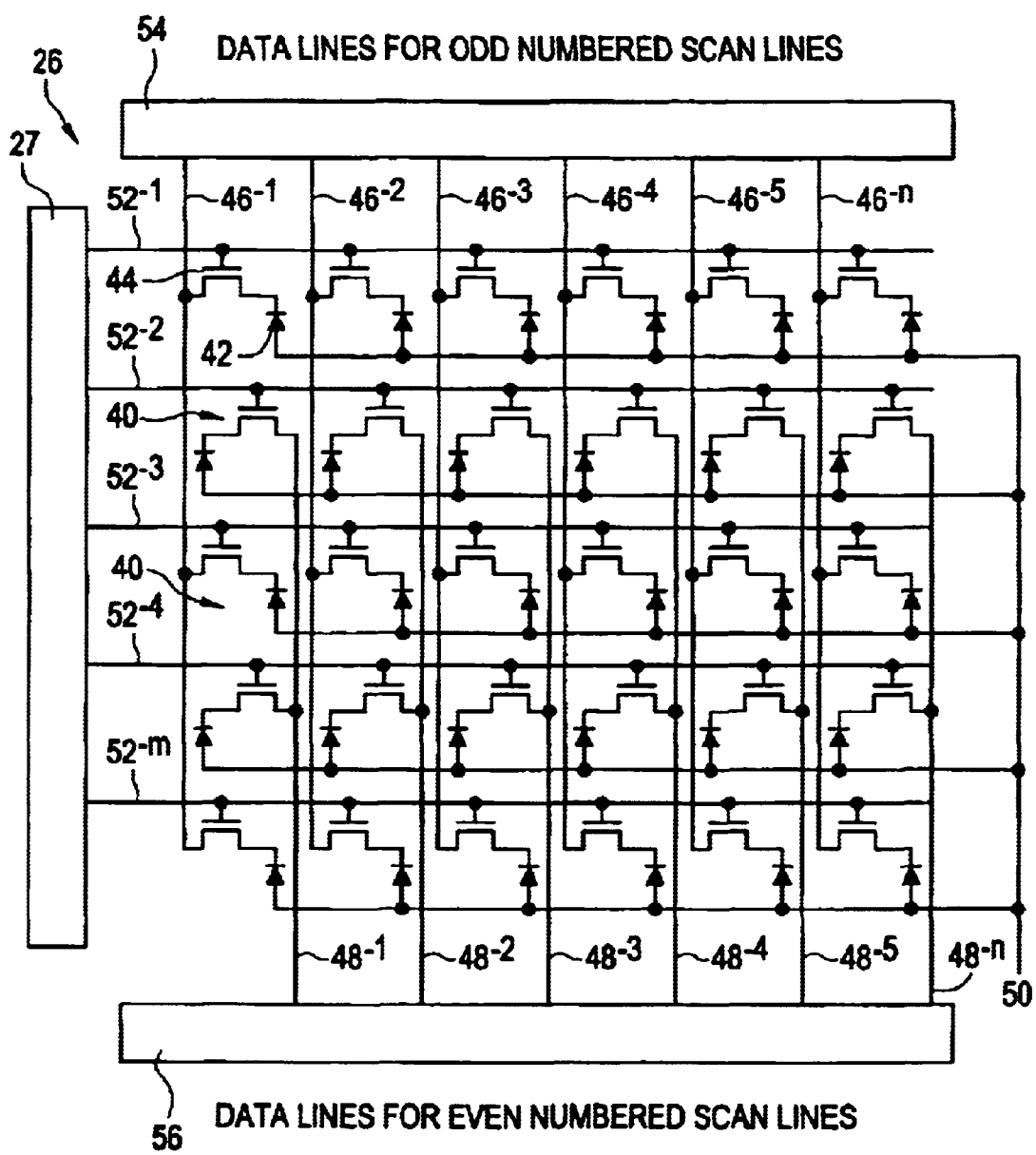
FIG. 2 illustrates the circuitry of a portion of a photo detector array with alternating scan lines formed in accordance with an embodiment of the present invention.

FIG. 2 illustrates the circuitry of a portion of a photo detector array 26 with alternating scan lines 52. The photo detector array 26 is formed by a matrix of detector elements 40. The detector elements 40 are arranged on an amorphous silicon wafer in a two-dimensional array of columns and rows. By way of example only, a typical high resolution x-ray detector 22 may comprise an array of 1,000,000 to over 4,000,000 detector elements 40. Each detector element 40 includes a photodiode 42 and a thin film field effect transistor (FET) 44. The photodiodes 42 are fabricated from a large wafer area in order that the photodiode 42 will intercept a sizeable portion of the light produced by the scintillator 24. Each photodiode 42 also has a relatively large capacitance that allows it to store the electrical charge resulting from the photon excitation.

The cathode of the photodiodes 42 in each column of the array 26 is connected by the source-drain conduction path of the associated FET 44 to a data line ($46^{-1}$ through $46^{-n}$) or ($48^{-1}$ through $48^{-n}$). Advances in solid state x-ray detector technology continue to reduce both the capacitance and resistance of the data lines 46 and 48. For example, data lines 46 and 48 may be formed from metals with lower impedance. Also, capacitance may be decreased by modifying the structure of the diode common 50 connected to the photodiode 42. Therefore, it is possible to utilize data lines 46 and 48 that are not separated at the midpoint, and each data line 46 and 48 runs the full dimension of the detector 22. Data lines 46 are connected to sensing circuits 54 and data lines 48 are connected to sensing circuits 56. The sensing circuits 54 and 56 are included in the image processor 28, but are shown separately for clarity. The anodes of the photodiodes 42 in each row are connected to the diode common 50.

The gate electrodes of the FETs 44 in each row are connected to a scan line ($52^{-1}$ through $52^{-m}$), such as scan line $52^{-1}$ for row 1. Each scan line 52 runs the full dimension of the detector 22. The scan lines 52 are coupled to the detector controller 27. It should be understood that although a limited number of data lines 46 and 48 and scan lines 52 are illustrated for clarity, the detector 22 includes many data and scan lines.

As illustrated in FIG. 2, the data lines 46 are connected to detector elements 40 of odd numbered scan lines 52, such that data lines ($46^{-1}$ through $46^{-n}$) are connected to detector elements 40 of the first and third rows, or scan lines $52^{-1}$ and $52^{-3}$. Data lines 48, however, are connected to detector elements 40 of even numbered scan lines 52, such that data lines ($48^{-1}$ through $48^{-n}$) are connected to detector elements 40 of the second and fourth rows, or scan lines $52^{-2}$ and $52^{-4}$. In other words, the data lines 46 and 48 connect to every other detector element 40 in a column, and thus the scan lines 52 alternate such that the odd numbered scan lines 52 are read by sensing circuits 54 and even numbered scan lines 52 are read by sensing circuits 56.

Figure 3:
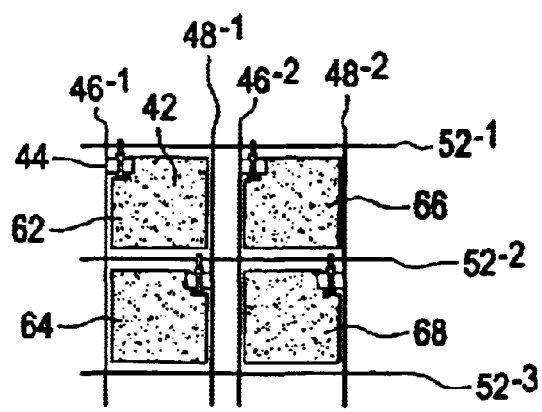
FIG. 3 illustrates a plan view of four detector elements with alternating scan lines formed in accordance with an embodiment of the present invention.

FIG. 3 illustrates a plan view of four detector elements 62–68 with alternating scan lines 52. FIG. 3 includes data lines $46^{-1}$, $46^{-2}$, $48^{-1}$, and $48^{-2}$ and scan lines $52^{-1}$, $52^{-2}$, and $52^{-3}$ as previously discussed. Each detector element 62–68 includes a FET 44 and a photodiode 42. In FIG. 3, data line 46 is connected to detector element 62 and data line $48^{-1}$ is connected to detector element 64. Therefore, the data lines 46 and 48 connect to every other detector element 40 in a column, and the data lines 46 and 48 alternate across detector 22. As a result, scan line $52^{-1}$ connects to detector elements 40 serviced by one set of sensing circuits 54 and scan line $52^{-2}$ connects to a detector elements 40 serviced by a different set of sensing circuits 56, thus alternating across detector 22 as illustrated in FIG. 2.

Returning to FIG. 2, in order to acquire an x-ray image using the detector 22, the x-ray system 14 performs the following sequence of operations. Initially, the detector 22 is scrubbed. Scrubbing may be performed to maintain proper bias on the photodiodes 42 during idle periods, to reduce the effects of image retention or lag, and/or to protect the operating characteristics of the FETs 44.

Scrubbing the detector 22 may be accomplished two consecutive rows at a time. Accordingly, one scan line 52 being scrubbed operates detector elements 40 connected to data lines 46, and the second scan line 52 operates detector elements 40 connected to data lines 48. By way of example only, consecutive scan lines $52^{-1}$ and $52^{-2}$ may be scrubbed at the same time. A negative voltage is applied to the diode common 50. The sensing circuits 54 and 56 then apply a less negative voltage to each data line 46 and 48. The scan lines $52^{-1}$ and $52^{-2}$ are switched from a voltage more negative than the diode common 50 voltage to a positive voltage, causing the FETs 44 attached to scan lines $52^{-1}$ and $52^{-2}$ to begin to conduct. The photodiodes 42 will then store charge required to come to a voltage difference between the data lines 46 and 48 and the diode common 50, after which the FETs 44 are switched off to the negative voltage once again. The next two scan lines (e.g. scan lines $52^{-3}$ and $52^{-4}$) are then scrubbed as above. The scan lines 52 may be scrubbed more than one time before an exposure is taken. No detector 22 data is stored during the scrubbing operation.

Then the detector 22 is exposed to an x-ray beam 17 generated in a conventional manner by the x-ray tube 15. The x-ray beam 17 comprises x-ray photons which are converted to lower energy photons by the scintillator 24. When these lower energy photons strike a photodiode 42 in the photo detector array 26, the photodiode 42 conducts and the capacitance of the photodiode 42 is partially discharged. The amount of charge removed from the capacitance of the given photodiode 42 depends upon the amount of lower energy photons which strike it, which in turn depends upon the intensity and duration of the x-ray beam 17 that strikes the region of the scintillator 24 adjacent to the photodiode 42. Therefore, the amount of charge removed from the photodiode 42 in each detector element 40 is a function of the x-ray intensity striking the corresponding region of the x-ray detector 22.

After the termination of the x-ray exposure, the charge in each photodiode 42 is restored two consecutive rows, or scan lines 52, at a time, similar to the method utilized while scrubbing the detector 22. The detector controller 27 simultaneously applies a positive voltage to two consecutive scan lines 52, such as scan lines $52^{-1}$ and $52^{-2}$ as previously discussed. When a scan line 52 is positively biased, the FETs 44 connected to that scan line 52 are turned on thereby coupling the associated photodiodes 42 in the selected row to their data lines 46 or 48. This time, the amount of charge needed to restore the voltage level between the data lines 46 and 48 and the diode common 50 is measured by the applicable sensing circuits 54 and 56. Any of several types of sensing circuits 54 and 56 may be incorporated into the image processor 28. For example, the sensing circuits 54 and 56 may measure the voltage across the photodiode 42, and therefore the amount of charge stored in the photodiode 42. Alternatively, the sensing circuits 54 and 56 may connect the associated data line 46 and 48 to a higher potential than the cathode of the photodiode 42 and measure the amount of charge that flows to or from the photodiode 42.

The scan lines 52 may be read in any order, such that it may be possible to begin reading the scan lines 52 at the center or in the top quarter of the detector 22, read to the bottom of detector 22, then read the scan lines 52 starting at the top of the detector 22 moving towards the center. However, two scan lines 52 may always be read simultaneously, one scan line which is connected to detector elements 40 serviced by data lines 46 and sensing circuits 54, and one scan line connected to detector elements 40 serviced by data lines 48 and sensing circuits 56. In the aforementioned examples, the two scan lines 52 which are read simultaneously may or may not be adjacent to each other.

It is also possible to define a region of interest (ROI) that is a subset of the detector 22. A smaller ROI may be desirable in order to acquire multiple consecutive images of the body or an organ, such as during a vascular or cardiac procedure. By defining an ROI, the acquisition frame rate may be increased as the scan lines 52 outside the ROI may be scrubbed during the x-ray exposure.

Figure 4:
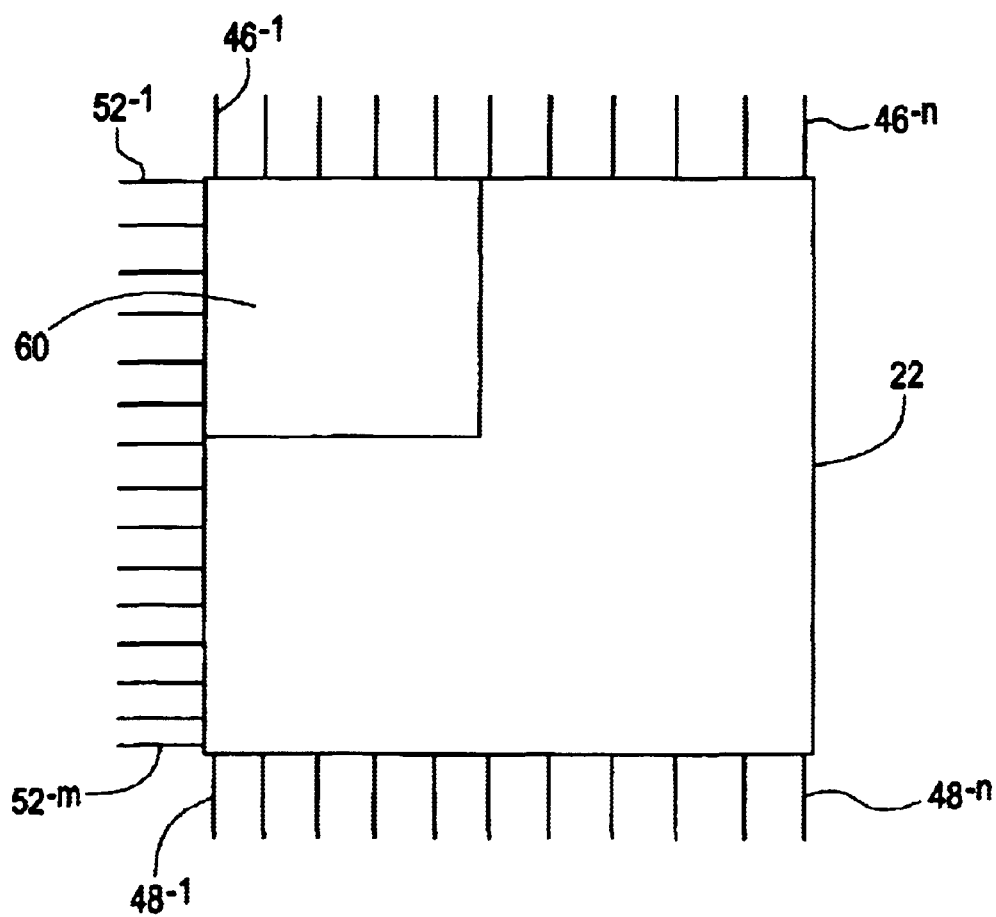
FIG. 4 illustrates a detector in which a region of interest has been defined in accordance with an embodiment of the present invention.

FIG. 4 illustrates a detector 22 in which an ROI 60 has been illustrated as the upper left hand quadrant of the detector 22. The detector 22, data lines ($46^{-1}$ through $46^{-n}$), data lines ($48^{-1}$ through $48^{-n}$), and row scan lines ($52^{-1}$ through $52^{-m}$) are included as previously discussed. The number n of data lines 46 and 48, and the number m of scan lines 52 is determined by the number of detector elements 40 included in detector 22.

The ROI 60 may be defined by an operator through the operator interface panel 38, such that the operator may define the size, location, and shape of the ROI 60. Therefore the ROI 60 may be randomly placed anywhere on the detector 22. Alternatively, the operator may choose a pre-defined ROI 60. In addition, the ROI 60 may be determined by the use of a collimator 19. For example, the collimator 19 may be used to block the x-ray beam 17 from striking the right hand side of the detector 22, or may mask the outside area of the detector 22 such that only a region in the center of the detector 22 receives radiation. The x-ray system 14 may not store the data acquired outside of the ROI 60 as discussed below.

While exposing the detector 22 to radiation, the detector controller 27 may either read or scrub the scan lines 52 outside the ROI 60. The data outside the ROI 60 is not of interest diagnostically and thus may be discarded or not collected. The scan lines 52 that are within the ROI 60 are then read after the exposure is complete, and the diagnostic data is saved as discussed previously. Reading or scrubbing the scan lines 52 outside the ROI 60 while the detector 22 is being exposed to radiation allows the scan lines 52 within the ROI to be read at a higher acquisition frame rate.

Figure 5:
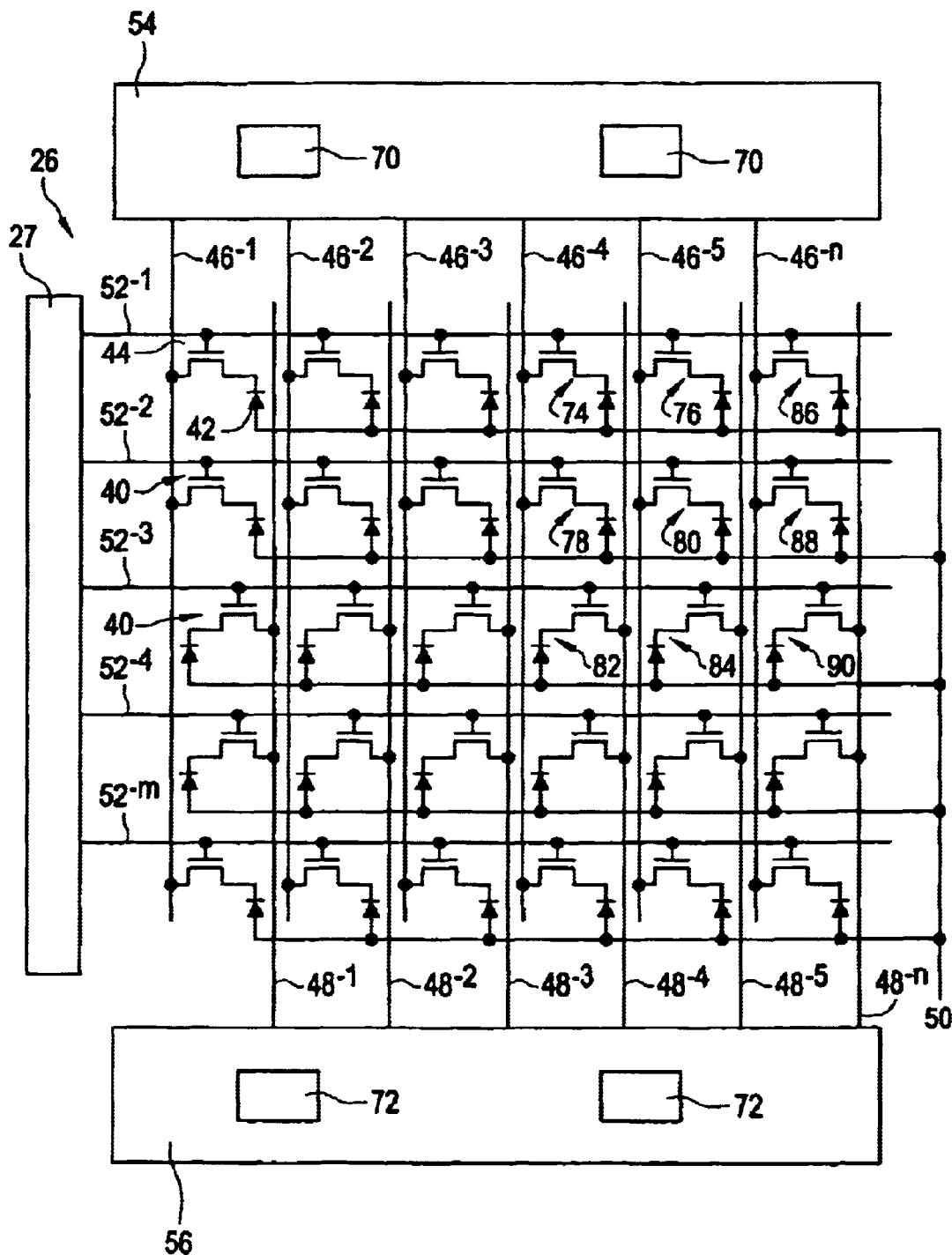
FIG. 5 illustrates the circuitry of a portion of a photo detector array with alternating groups of scan lines which control detector elements serviced by alternating data lines formed in accordance with an embodiment of the present invention.

FIG. 5 illustrates the circuitry of a portion of a photo detector array 26 with alternating groups of consecutive scan lines 52 which control detector elements 40 that are serviced by alternating data lines 46 and 48. The photo detector array 26 may be read with a reduced resolution. Similar to FIG. 2, data lines 46 are connected to sensing circuits 54 and data lines 48 are connected to sensing circuits 56. However, data lines 46 and 48 are interspersed such that data lines 46 are connected to detector elements 40 controlled by a group of two or more consecutive scan lines 52, such as 2, 3, 4, or 6 scan lines 52, alternating with data lines 48 connected to detector elements 40 controlled by the next group of an equivalent number of consecutive scan lines 52. Therefore, rather than single scan lines 52 alternating, groups of scan lines 52 alternate.

Sensing circuits 54 and 56 further include data reduction circuits 70 and 72, respectively. When full resolution of the detector array 26 is not required, data reduction circuits 70 and 72 may combine the signals from multiple detector elements 40 into one signal. The detector elements 40 are combined in equal numbers along the rows and columns to avoid distorting the resultant image. For example, a matrix of 4 detector elements 40, such as detector elements 74–80, or a matrix of 9 detector elements 40, such as detector elements 74–90 if three consecutive scan lines 52 form a group, may be combined. Alternatively, for full resolution, one scan line 52 within each group of scan lines may be read at a time as discussed previously in FIG. 2.

An ROI 60 may also be defined at any position on detector 22. The detector elements 40 are read as discussed previously, however, more than one scan line 52 is read simultaneously by each of sensing circuits 54 and 56. For example, scan lines $52^{-1}$ and $52^{-2}$ may be read by sensing circuit 54 and scan lines $52^{-3}$ and $52^{-4}$ may be read by sensing circuit 56 simultaneously. Alternatively, sensing circuits 54 and 56 may simultaneously read multiple scan lines 52 from groups of consecutive scan lines 52 which are not adjacent. Also, the detector elements 40 outside the ROI are read or scrubbed during the exposure. Therefore, increased acquisition frame rates may be achieved when acquiring an image utilizing either the entire x-ray detector 22 or the detector elements 40 within the ROI 60.

FIG. 6 illustrates a method for acquiring data within an ROI 60 using a detector 22 with alternating scan lines 52. Single scan lines 52 may alternate as illustrated in FIG. 2, or groups of scan lines 52 may alternate as illustrated in FIG. 5. As previously discussed, the ROI 60 may be located anywhere on the detector 22. At step 100, an ROI 60 is defined. The ROI 60 may be defined by the operator through the operator interface panel 38 or may be predefined. Alternatively, the ROI 60 may be defined by sensing the position, type, and/or size of the collimator 19.

At step 102, the detector controller 27 scrubs the detector 22 as previously discussed, in preparation for the image acquisition. At step 104, the system controller 36 initiates an exposure. At the same time as the detector 22 is being exposed, the scan lines 52 outside of the ROI 60 are scrubbed at step 106. As discussed previously, the data from the scan lines 52 outside of the ROI 60 does not contain diagnostic data of interest and is discarded.

At step 108, the scan lines 52 within the ROI 60 are read and the data is saved to the image storage device 30 and/or displayed on the video monitor 32. The scan lines 52 may be read two scan lines 52 at a time or two groups of scan lines 52 at a time as previously discussed in FIG. 2 and FIG. 5, respectively. At step 110, the system controller 36 identifies whether another image, or frame of data, is to be acquired. If another image is to be acquired, flow returns to step 104. If no more images are to be acquired, flow passes to step 112 and the method is complete.

As illustrated with the method of FIG. 6, less time is required to read out the scan lines 52 within the ROI 60 than is required to read out all of the scan lines 52 in the detector 22. Therefore, by using a detector 22 with alternating scan lines 52 or alternating groups of scan lines 52 and defining an ROI 60, the acquisition frame rate may be increased. Thus, more image data may be acquired in less time. Also, because the scan lines 52 alternate, such that the odd numbered scan lines 52 (or first group of consecutive scan lines 52) are read by the sensing circuits 54 and the even numbered scan lines 52 (or the adjacent group of consecutive scan lines 52) are read by the sensing circuits 56, the ROI 60 may be located anywhere on the detector 22 and still achieve the benefits of an increased acquisition frame rate.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An x-ray system utilized to acquire an image, the x-ray system comprising:
   an x-ray detector comprising detector elements arranged in rows and columns, said detector elements storing a charge representative of an x-ray level;
   first and second sets of sensing circuits reading said charge from said detector elements;
   scan lines connecting to each of said detector elements in one of said rows and columns; and
   first and second sets of data lines connecting to a portion of said detector elements in said one of said rows and columns, said first set of data lines being connected to said first set of sensing circuits, said second set of data lines being connected to said second set of sensing circuits, wherein at least one data line from said first set of data lines is interspersed with said second set of data lines.

2. The x-ray system of claim 1, wherein each said data line of said first set of data lines alternates with each said data line of said second set of data lines.

3. The x-ray system of claim 1, wherein said charge read from said detector elements outside a region of interest is discarded.

4. The x-ray system of claim 1, further comprising an operator interface for defining a region of interest comprising a portion of the x-ray detector, said first and second sets of sensing circuits reading said detector elements outside said region of interest while the x-ray detector is exposed to a radiation source.

5. The x-ray system of claim 1, said first and second sets of sensing circuits simultaneously reading said charge stored by said detector elements connecting to at least two said scan lines.

6. The x-ray system of claim 1, said first and second sensing circuits simultaneously reading charge, said first sensing circuit reading said charge from said detector elements connecting to a first group of at least two consecutive said scan lines, said second sensing circuit reading said charge from said detector elements connecting to a second group of at least two consecutive said scan lines.

7. An x-ray system utilized to produce an image, the system comprising:

an x-ray source for generating x-rays;

a detector comprising detector elements arranged in rows and columns, said detector elements storing charge representative of an x-ray level;

first and second sets of sensing circuits connected through data lines in red said charge from first and second sets of said detector elements, respectively; and first and second sets of scan lines comprising groups including at least one consecutive scan line connecting to each said detector element in one of said rows and columns, said first and second sets of scan lines connecting to said first and second sets of detector elements, respectively, said groups included in said first set of scan lines being adjacent to and alternating with groups included in said second set of scan lines.

8. The x-ray system of claim 7, wherein said data lines further compromise first and second sets of data lines connecting to said first and second sets of said detector elements, respectively, said data lines being perpendicular to said scan lines.

9. The x-ray system of claim 7, said first and second sets of sensing circuits acquiring data outside a region of interest while said x-ray source generates said x-rays.

10. The x-ray system of claim 7, further comprising a system controller identifying said scan lines within a region of interest.

11. The x-ray system of claim 7, wherein said data lines further compromise first and second sets of data lines connecting to said first and second sets of detector elements and crossing one dimension of said detector, said first set of data lines being adjacent to and alternating with said second set of data lines.

12. The x-ray system of claim 7, said first and second sensing circuits further comprising data reduction circuits, said data reduction circuits combining said charge from at least two said detector elements.

13. The x-ray system of claim 7, said first and second sensing circuits further comprising data reduction circuits, said data reduction circuits combining said levels of charge stored by at least two adjacent said detector elements included in the same said group of scan lines.

14. The x-ray system of claim 7, further comprising:

an operator interface for defining a region of interest comprising a portion of the detector; and a system controller identifying said scan lines within said region of interest.

15. A method for acquiring x-ray data within a region of interest, the method comprising:

defining a region of interest in an x-ray detector comprising detector elements connected to data and scan lines, said data and scan lines being perpendicular to each other and each crossing one dimension of the x-ray detector, said scan lines forming first and second sets of scan lines read by first and second sensing circuits, respectively, said first and second sets of scan lines compromising groups, each group comprising at least one consecutive scan line, said groups included in said first set of scan lines being adjacent to and alternating with said groups included in said second set of scan lines;

exposing the x-ray detector to a radiation source;

after the x-ray detector is exposed, simultaneously reading levels of charge stored by said detector elements included in a first group included in said first set of scan lines and a second group included in said second set of scan lines with first and second sensing circuits, respectively, said first and second groups of scan lines being included in said region of interest; and simultaneously reading said levels of charge stored by said detector elements included in a third group included in said first set of scan lines and a fourth group included in said second set of scan lines with first and second sensing circuits, respectively, said third and fourth groups being included in said region of interest.

16. The method of claim 15, further comprising:

during said exposing step, reading said levels of charge stored by said detector elements included in said groups of scan lines outside said region of interest with said first and second sensing circuits; and discarding data based upon said levels of charge stored by said detector elements outside said region of interest.

17. The method of claim 15, further comprising combining said levels of charge stored by at least two said detector elements included in the same said group of scan lines.

18. The method of claim 15, further comprising combining said charge stored by at least two said detector elements.

19. The method of claim 15, further comprising reading levels of charge with said first and second sensing circuits simultaneously with exposure, said levels of charge stored by said detector elements outside said region of interest.

20. The method of claim 15, wherein said groups include at least two consecutive scan lines, each of said groups including an equal number of consecutive said scan lines.

21. The method of claim 15, said defining step further comprising defining said region of interest to be within one of a top and bottom half of said x-ray detector, one of said first and second groups including one of a first and last scan line included in said region of interest.

22. The method of claim 15, further comprising:

storing data representative of said levels of charge of said detector elements within said region of interest; and discarding data representative of said levels of charge of said detector elements outside said region of interest.

* * * * *